United States Patent [19]

McMahan et al.

[11] Patent Number: 5,749,637
[45] Date of Patent: May 12, 1998

[54] COMPUTER SYSTEM CHASSIS HAVING A SELECTIVELY EXTENDIBLE SUPPORT ASSEMBLY FOR CONVERSION BETWEEN DESKTOP AND TOWER PATFORMS

[75] Inventors: Robert L. McMahan, Cedar Park; Maureen Martinez, Austin, both of Tex.

[73] Assignee: Dell USA, L.P., Austin, Tex.

[21] Appl. No.: 539,383

[22] Filed: Oct. 5, 1995

[51] Int. Cl.⁶ .................................................. A47B 91/00
[52] U.S. Cl. .................. 312/223.2; 220/629; 248/688; 248/685; 248/677; 312/351.9
[58] Field of Search ................. 312/223.1, 223.2, 312/351.1, 351.9, 351.3, 324; 220/629; 248/688, 685, 188.8, 677; 361/683, 724

[56] References Cited

U.S. PATENT DOCUMENTS

| | | | |
|---|---|---|---|
| 2,695,548 | 11/1954 | Silverman | 312/351.9 X |
| 3,587,453 | 6/1971 | Klein | 248/188.8 X |
| 4,456,315 | 6/1984 | Markley et al. | 312/7.2 X |
| 4,505,408 | 3/1985 | Sagol | 220/629 X |
| 4,635,811 | 1/1987 | Lodi | 220/629 |
| 4,951,241 | 8/1990 | Hosoi et al. | 364/708.1 X |
| 5,020,768 | 6/1991 | Hardt et al. | 312/223.2 X |
| 5,024,414 | 6/1991 | Drain | 248/688 |
| 5,129,715 | 7/1992 | Maynard, Jr. | 312/351.9 |
| 5,388,792 | 2/1995 | Hastings | 248/188.8 X |
| 5,601,541 | 2/1997 | Swisher | 248/188.7 X |

*Primary Examiner*—Peter M. Cuomo
*Assistant Examiner*—Janet M. Wilkens
*Attorney, Agent, or Firm*—Haynes and Boone, L.L.P.

[57] ABSTRACT

A computer chassis with an affixed support assembly on one side, wherein the computer chassis is configurable between desktop and tower configurations. The chassis includes a first side which corresponds to the lower side of a desktop-type chassis and a second side which corresponds to the lower side of a tower-type chassis. The support assembly is attached to the second side and includes at least one selectively extendible support member. The support member is selectively extendible between a first, retracted position wherein it forms a relatively unobtrusive and aesthetic side surface and a second, extended position where it forms a broad supporting base for the chassis when placed on its second side in the manner of a tower platform. Methods and apparatus are also described by which a computer system can be converted between a desktop platform and a tower platform quickly and easily.

6 Claims, 4 Drawing Sheets

COMPUTER SYSTEM CHASSIS HAVING A SELECTIVELY EXTENDIBLE SUPPORT ASSEMBLY FOR CONVERSION BETWEEN DESKTOP AND TOWER PATFORMS

FIELD OF THE INVENTION

The present invention relates to support assemblies for a computer chassis or system unit which may be retracted or extended to form a supporting base for the chassis. Further, the invention relates to a method and apparatus for quickly and efficiently transforming a computer system between a desktop platform and a tower platform.

DESCRIPTION OF THE RELATED ART

Currently, mid-size, non-portable computers are available in two primary platforms: the desktop and the tower. The chassis or system unit of a desktop platform has a relatively large footprint and reduced height and is typically placed on the desk beneath the monitor. The tower chassis has a smaller footprint and a much greater height and is usually positioned on the floor adjacent a table which supports the computer monitor and keyboard.

A customer is traditionally required to choose a platform which best suits his needs at purchase time. Following purchase, however, many customers change their minds, or, due to floor or desktop space limitations, desire the other type of platform. For example, many owners of desktop platforms move the desktop chassis to the floor and stand the chassis on its left or right side to approximate a tower design, thus freeing up valuable desk space. However, the side of the chassis which is placed in contact with the floor may tend to scuff or scratch. Also, many chassis designs are vented through their left and/or right sides, and placing the unit on its side inhibits venting through that side.

This manner of floor placement of a desktop chassis is not recommended for other reasons. When a desktop platform is stood on its end in such a manner, it is less stable and is prone to tipping. This is because desktop computers are not designed to stand on their side, and a desktop computer stood on its side has a small footprint relative to its height. In addition, the various peripherals are less accessible or may not operate properly when turned on their side. For example, when the desktop unit is stood on its side, a "caddyless" CD-ROM unit in the system that is turned on its side may not operate properly.

Computer stands are commercially available which permit a desktop style computer chassis to be stood on its end on the inside of the relatively stable platform provided by the stand. However, the user must purchase this accessory separately, and many stands may not fit all desktop designs sufficiently well.

Therefore, it is generally undesirable to turn a desktop chassis or unit on its side in order to use the desktop computer in a tower configuration. In addition, the prior art has heretofore not provided a chassis configuration or method which allows a tower chassis to be easily converted into a desktop configuration.

Therefore, a new computer chassis design is desired which allows a user to easily transform the system between desktop and tower configurations.

SUMMARY OF THE INVENTION

In the exemplary embodiments described, a computer system is featured which includes a chassis or system unit with an affixed support assembly on one side. The support assembly enables the computer chassis to be easily converted between desktop and tower configurations.

The chassis presents a first side which corresponds to the lower side of a desktop-type chassis and a second side which corresponds to the lower side of a tower-type chassis. The support assembly includes at least one selectively extendible support member. The support member is selectively extendible between a first, retracted position wherein it forms a relatively unobtrusive and aesthetic side surface when the computer is in the desktop position and a second, extended position where it forms a broad supporting base for the chassis when placed on its second side in the manner of a tower platform. Methods and apparatus are also described by which a computer system may be converted between a desktop platform and a tower platform quickly and easily.

The support assembly preferably comprises a plurality of hinged panels connected to the chassis, wherein each of the hinged panels are moveable between the first and second positions by pivoting the panel about a pivot point. In an alternate embodiment, the support assembly comprises a laterally moveable panel which is reversibly attached to the chassis by complimentary snaps which permit attachment of the panel to the chassis in retracted and extended positions.

DETAILED DESCRIPTION OF THE PREFERRED EMBODIMENT

Figure 1A:
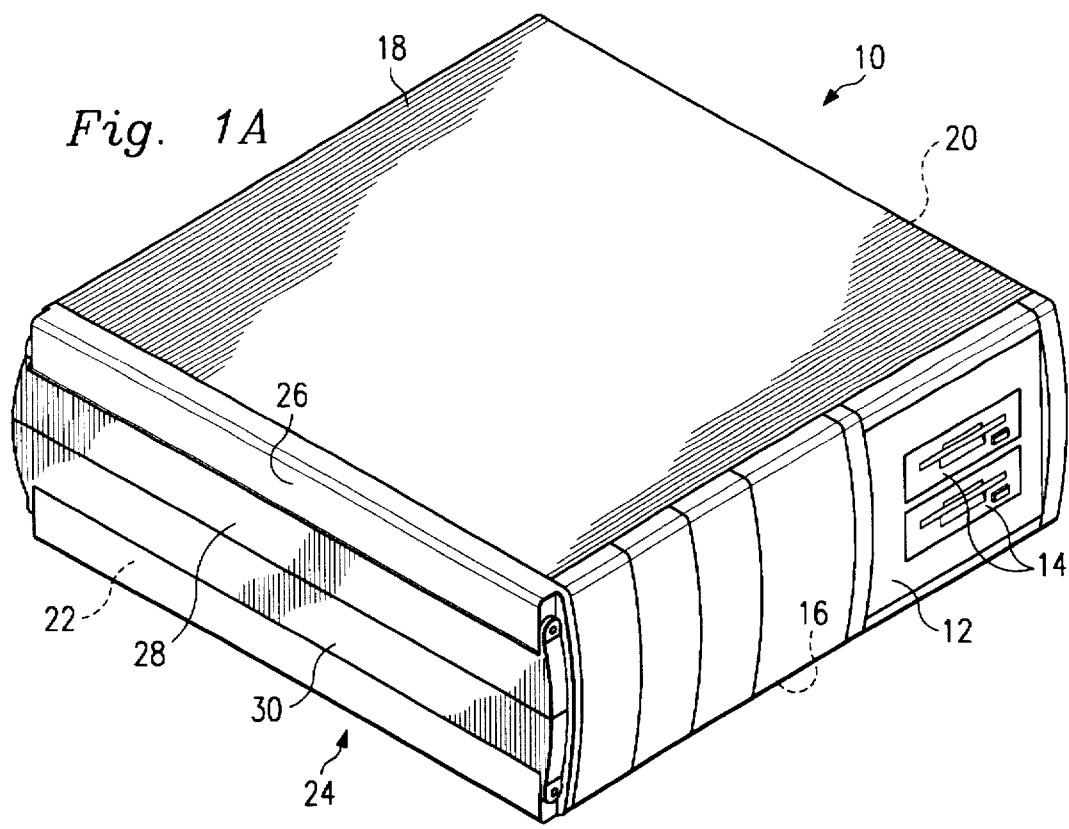
FIG. 1A shows an isometric view of an exemplary chassis being utilized as a desktop unit wherein the inventive support assembly is shown having hinged extendible support members in a first, retracted position.
Figure 1B:
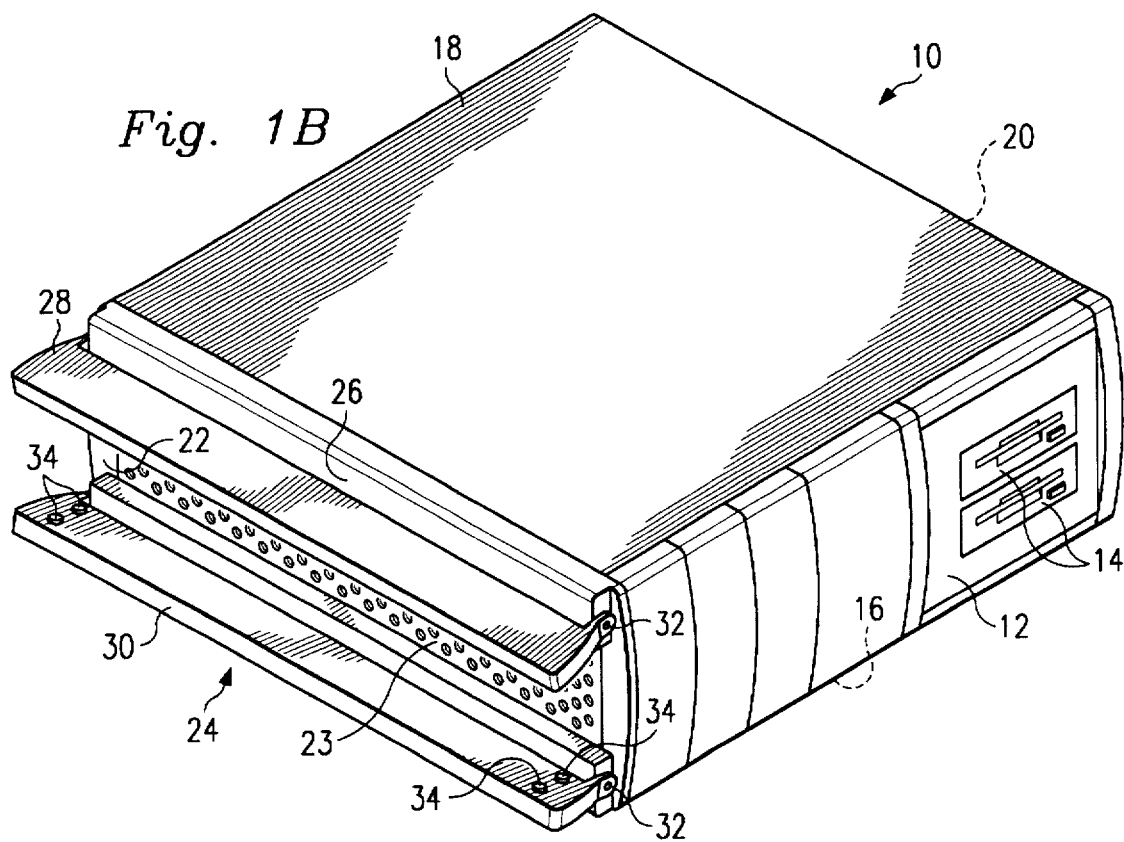
FIG. 1B is an isometric view of the chassis of FIG. 1A with the hinged support members being moved toward a second, extended position.
Figure 1C:
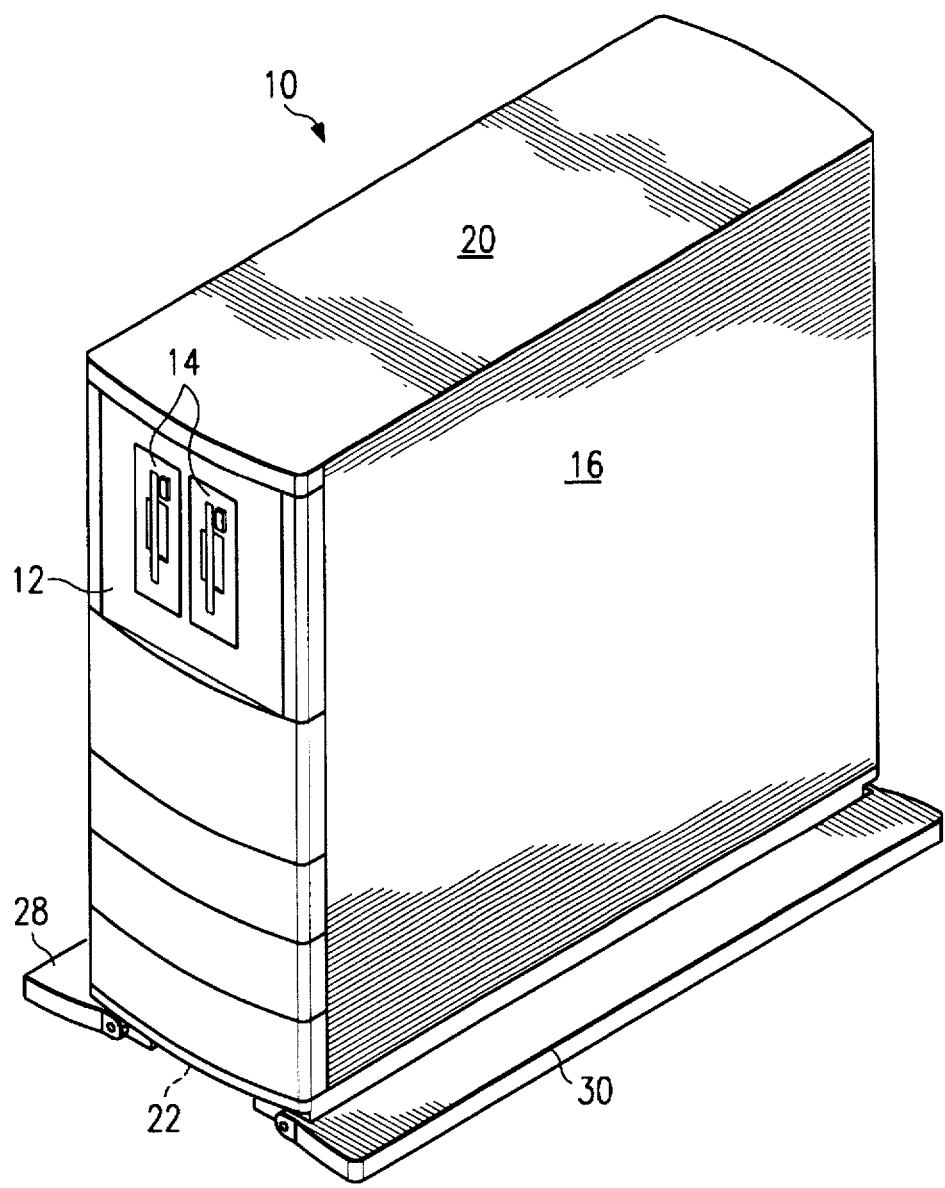
FIG. 1C is an isometric view of the chassis of FIGS. 1A and 1B with the hinged support members fully moved to the second, extended position and the chassis having been positioned as a tower.

FIGS. 1A through 1C depict a first exemplary embodiment of a computer system according to the present invention. As shown, the computer system comprises a computer chassis 10 which includes a front face 12 that normally faces in the general direction of an operator while in use. The chassis 10 encloses the functional computer components such as the motherboard, hard drive power supply and so forth. It is noted that front face 12 preferably contains a number of features including an on/off switch, reset switch, one or more drive bays for a floppy drive, CD-ROM drive, or tape drive LED displays and so forth—the number, type and location of these features being variable among chassis models. An exemplary pair of floppy drive bays 14 is shown within front face 12 for reference.

FIG. 1A illustrates the computer chassis 10 in a desktop configuration. As shown, the computer system chassis 10 has a relatively large footprint when in the desktop configuration. In the desktop configuration illustrated in FIG. 1A, the chassis 10 is normally placed so that surface 16 is parallel and proximate to, i.e. resting on, a desktop or other flat surface (not shown). Thus, the surface 16 is the bottom of the chassis 10 when the chassis 10 is in a desktop configuration and is in its normal resting position. It is noted that surface 16 preferably includes a number of rubber feet 17, shown in FIG. 1C, or other protective measures wherein the surface 16 does not contact the desktop or supporting surface. This prevents the surface 16 from scratching, scraping or scuffing the desktop or furniture.

The chassis 10 includes a side 18 which is located opposite side 16 of the chassis 10. In the desktop configuration illustrated in FIG. 1A, side 18 typically functions as a support surface for a monitor. It is further shown that the chassis 10 includes (from the user's perspective) a right-hand side 20 and a left-hand side 22, which are normally relatively featureless in conventional chassis designs.

In the preferred embodiment shown in FIG. 1A, the left-hand side 22 includes a support assembly 24 according to the present invention. It is noted that the support assembly may be positioned on either the left-hand side 22 or the right-hand side 24 as desired. The support assembly comprises a bracket 26 and support members 28 and 30. As best shown in FIG. 1B, the support members 28 and 30 are pivotally attached to the bracket 26 by hinge pins 32. The support members 28, 30 are preferably comprised of plastic (possibly glass filled) and are normally texturized on their outer surface. Thus, in the retracted position shown in FIG. 1A, the support assembly 24 presents the appearance of a conventional chassis side panel with a cosmetic outer surface. As a result, the support members 28, 30 preferably match or compliment the appearance of the chassis 10.

The bracket 26 is affixed to the left-hand side 22 of the chassis 10 by screws or other conventionally known means so that the bracket 26 is secured in place. The computer chassis 10 is preferably constructed and sold including the support assembly 24 incorporated into the chassis 10. Alternatively, the support assembly 24 may be added to the chassis 10 at a later time. Side 22 preferably includes a cover 23 comprising sheet metal including "punched out" attachment features.

Operation of the support assembly 24 and its use to convert the chassis 10 between a desktop configuration and a tower configuration is illustrated by reference to FIGS. 1A–1C. FIG. 1A illustrates the support members 28, 30 in a fully retracted position forming a relatively unobtrusive and cosmetic outer surface over the left-hand side 22 of the chassis 10. When the support members 28 and 30 are in a retracted position, the chassis 10 is preferably placed so that the chassis 10 rests upon side 16 in a typical desktop configuration.

Referring now to FIG. 1B, support members 28, 30 are shown being pivotally moved about the pins 32 toward a second position, shown in FIG. 1C. Referring now to FIG. 1C, the support members 28 and 30 are fully moved to their second, extended position, thereby forming a relatively wide, stable base for the chassis 10 to be utilized as a tower chassis. In a tower configuration, the support members 28, 30 are placed in contact with the floor or other supporting surface. During the extension of the members 28, 30, movement of the members 28, 30 occurs in diverging directions. As FIG. 1B illustrates, the support members 28, 30 preferably include rubber feet 34 or other protective measure. When the chassis 10 is placed into the resting position shown in FIG. 1C, it is noted that side 22 lies parallel and proximate to the supporting surface (not shown).

In the preferred embodiment, the support members 28, 30 and the bracket 26 are fashioned such that the support members 28, 30 may be "locked" into either a retracted or extended position. The locking mechanism preferably comprises detents.

Figure 2A:
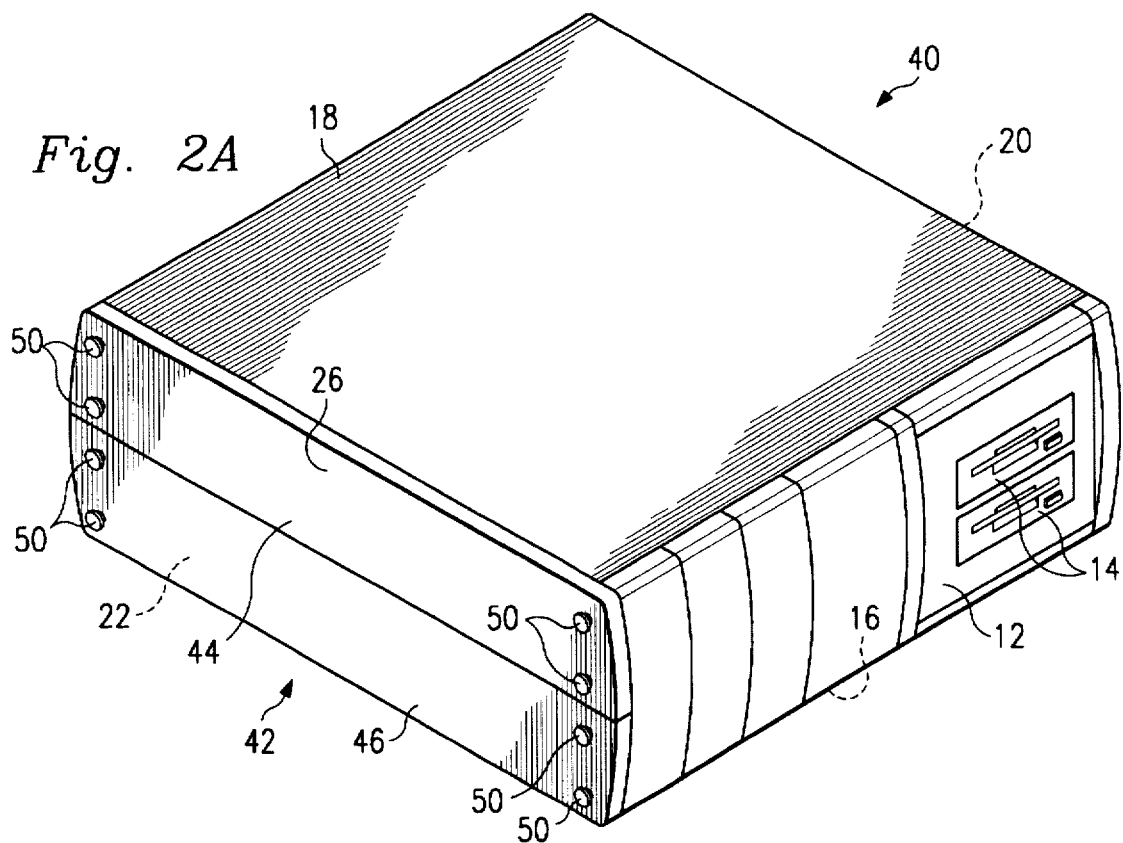
FIG. 2A is an isometric view of an exemplary chassis according to an alternate embodiment being utilized as a desktop unit, wherein the support assembly is shown having laterally moveable extendible support members in a first, retracted position.
Figure 2B:
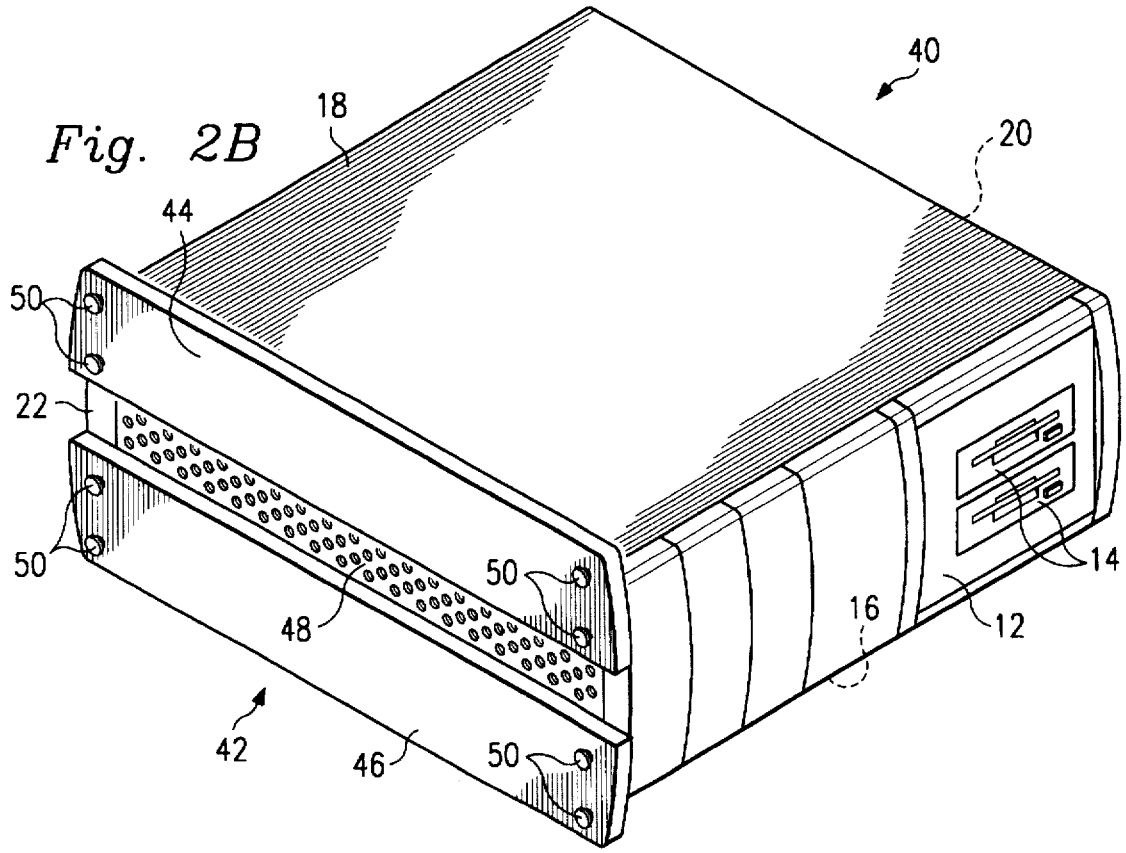
FIG. 2B is an isometric view of the chassis of FIG. 2A with the laterally moveable support members being moved toward a second, extended position.
Figure 2C:
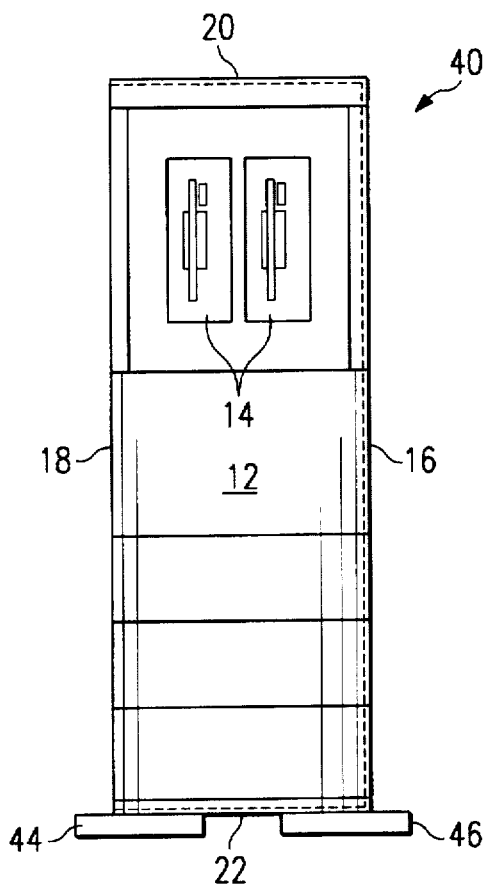
FIG. 2C is an end view of the chassis of FIGS. 2A and 2B with the laterally moveable support members fully moved to the second, extended position and the chassis having been positioned as a tower.

An alternative embodiment of the present invention is shown in FIGS. 2A–2C. Exemplary chassis 40 is similar to the exemplary chassis 10 in most relevant respects. Therefore, like reference numerals are used for like components—i.e., sides 12, 16, 18, 20, and 22 and drive bays 14.

Figure 3A:
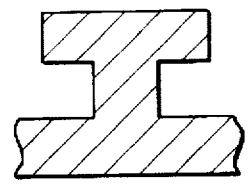
FIG. 3A is cross-section of the support member taken along line 3A—3A in FIG. 3.
Figure 3:
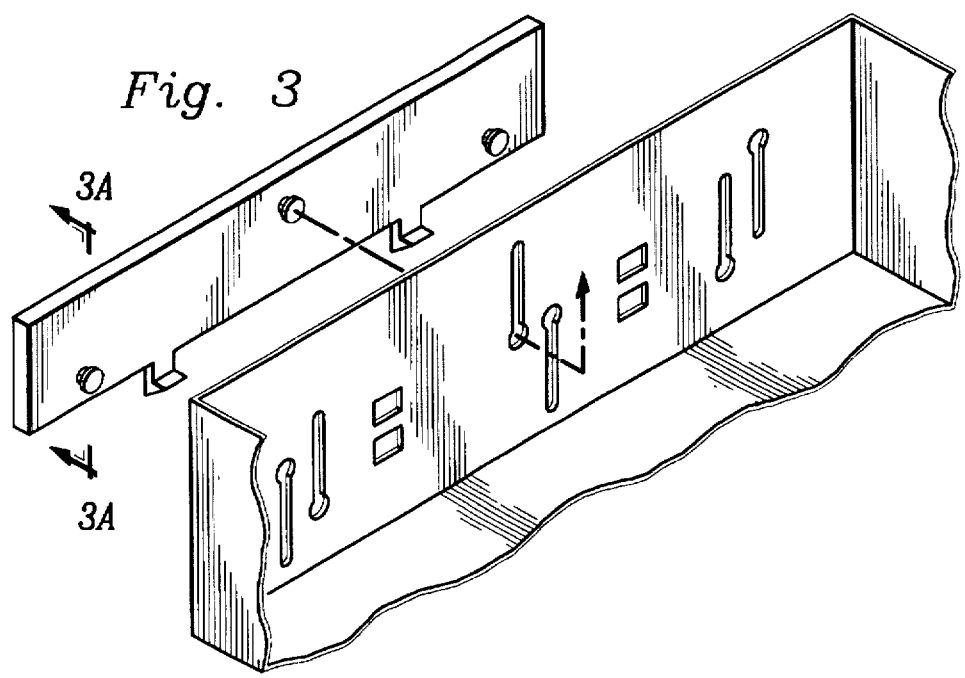
FIG. 3 illustrates retaining features used in the embodiments of FIGS. 2A–2C.

As shown in FIGS. 2A–2C, the chassis 40 includes an alternative support assembly 42 which is comprised of a pair of laterally moveable support members 44, 46. The support members 44, 46 comprise panels which are affixed to the chassis 40 by an attachment means which permits the members 44, 46 to be extended and retracted through lateral movement. The chassis 40 and support members 44, 46 might, for example, be fitted with sets of complimentary snaps which would permit the support members 44, 46 to be removably attached to the chassis in either the retracted position (FIG. 2A) or the extended position (FIG. 2B). Alternatively, as shown in FIG. 3, the chassis 40 and support members 44, 46 are interconnected using a tongue-and-groove arrangement which permits the support members 44, 46 to be slidingly moved between the retracted and extended positions. A locking arrangement, preferably comprising detents, is preferably included which permits the support members 44, 46 to be secured into either the retracted or extended positions.

In FIG. 2A, the chassis 40 is shown in an initial resting position corresponding to the resting position of a desktop-type computer platform, and the support assembly 42 is in a retracted position. FIG. 2B illustrates lateral extension of the support members 44, 46 so that the chassis 40 may be placed into a tower configuration, as shown in FIG. 2C. As with the support members 28, 30 of the first-described embodiment, movement of the support members 44, 46 occurs in diverging directions.

As with chassis 10, a plate or cover 48 is preferably affixed at side 22 to prevent damage to interior components of the chassis 40. The surface of cover 48 is preferably solid sheet metal including "punched out" attachment features. Also, rubber feet 50 are preferably affixed to the support members 44, 46 for contacting a supporting surface.

With use of the present invention, a chassis with an affixed support assembly may be quickly and easily converted from a tower configuration to a desktop configuration by reversing the appropriate operational steps described above. Movement of the support members in this operation occurs in converging, rather than diverging directions.

Therefore, the present invention comprises a computer chassis which is readily convertible between desktop and tower configurations.

It will be readily understood by those skilled in the art that the present invention is susceptible of a broad utility and application. Many embodiments and adaptations of the present invention, other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for the purposes of providing a full and enabling disclosure of the invention. The foregoing disclosure is not intended or to be construed to limit the present invention or otherwise exclude any such embodiments, adaptations, variations, modifications and equivalent arrangements. The present invention is limited only by the claims appended hereto and the equivalents thereof.

We claim:

1. A computer system which is configurable between desktop and tower platforms, comprising:

a chassis for enclosing components, the chassis comprising:
      a first side being proximate and substantially parallel to a first supporting surface during resting of the chassis in a desktop position; and
      a second side being proximate and substantially parallel to a second supporting surface during resting of the chassis in a tower position, the second side having a length and being bounded between a first outer edge and a second outer edge, each of the outer edges located along the length of the second side;
   a chassis support assembly for stabilizing the chassis in the tower position, the chassis support assembly being connected to the second side of the chassis and comprising a bracket and a support member, the bracket being connected to the second side proximate the first outer edge of the second side;
   and wherein the support member is connected to the bracket by a pin such that the support member is pivotable about the bracket between a retracted position and an extended position, the extended position being characterized in that the support member extends outwardly from the second side beyond the first outer edge of the second side, the retracted position being characterized in that the support member lies substantially between the first outer edge and the second outer edge.

2. The computer system of claim 1, wherein the support member further comprises an outer surface and an inner surface, the inner surface of the support member comprising at least one rubber member adapted to contact the second supporting surface during resting of the chassis in the tower position, and wherein the retracted position is further characterized in that the inner surface of the support member faces the second side, and wherein the extended position is further characterized in that the inner surface of the support member faces away from the second side.

3. The computer system of claim 1, wherein the chassis support assembly further comprises an additional support member, wherein the support member and the additional support member each extend substantially along the length of the second side of the chassis.

4. The computer system of claim 1, wherein the chassis support assembly is adapted to substantially cover the second side of the chassis.

5. The computer system of claim 1, wherein the first side further comprises at least one rubber member adapted to engage said first supporting surface during resting of the chassis in a desktop position.

6. The computer system of claim 1, wherein said support member forms an aesthetic surface for said chassis in said retracted position.

* * * * *